Feb. 19, 1952  J. C. HAUN  2,586,650
PLUG VALVE
Filed Jan. 10, 1947  2 SHEETS—SHEET 1
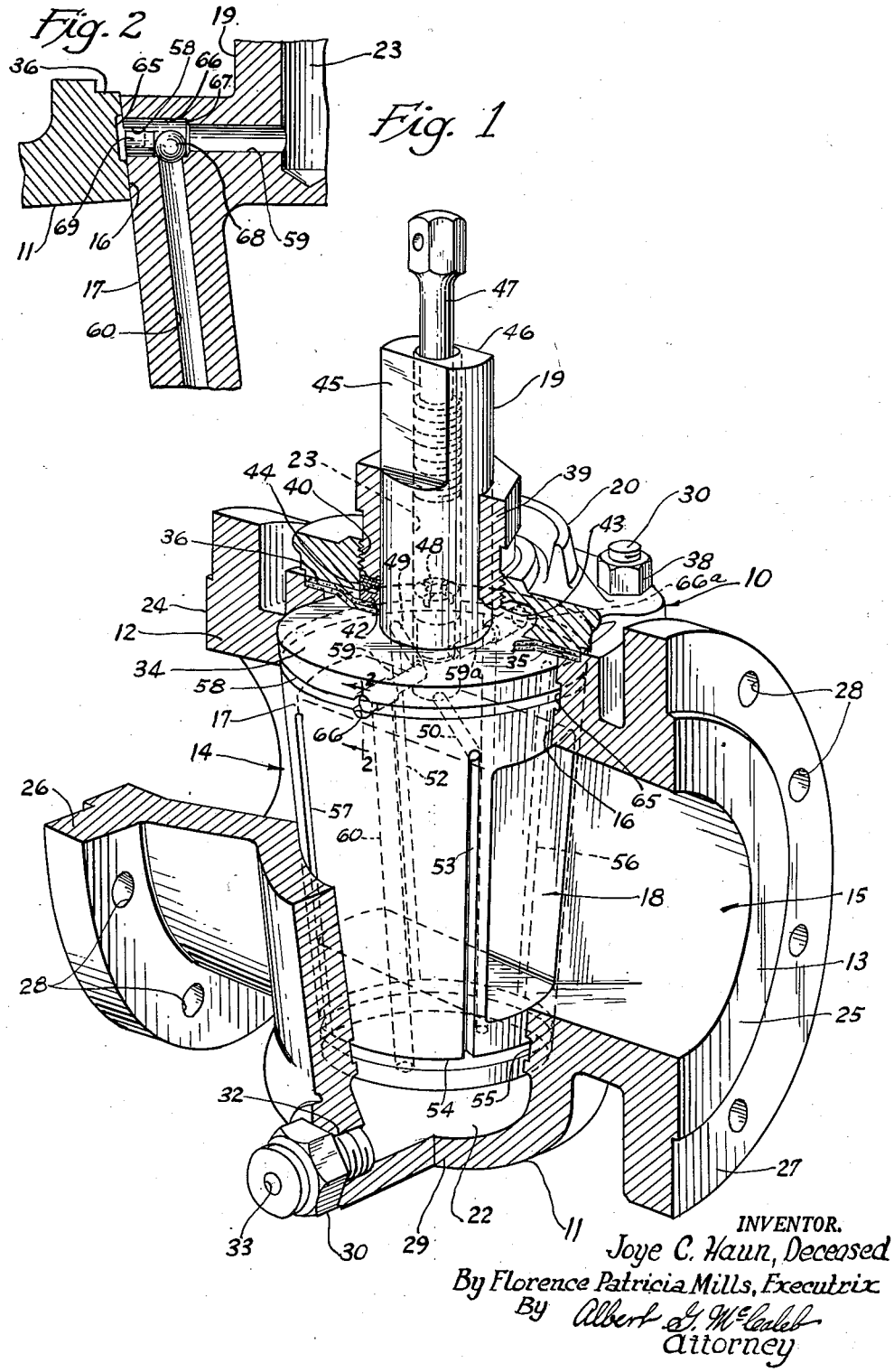
INVENTOR.
Joye C. Haun, Deceased
By Florence Patricia Mills, Executrix
By Albert G. McCaleb
Attorney Feb. 19, 1952  J. C. HAUN  2,586,650
PLUG VALVE
Filed Jan. 10, 1947  2 SHEETS—SHEET 2
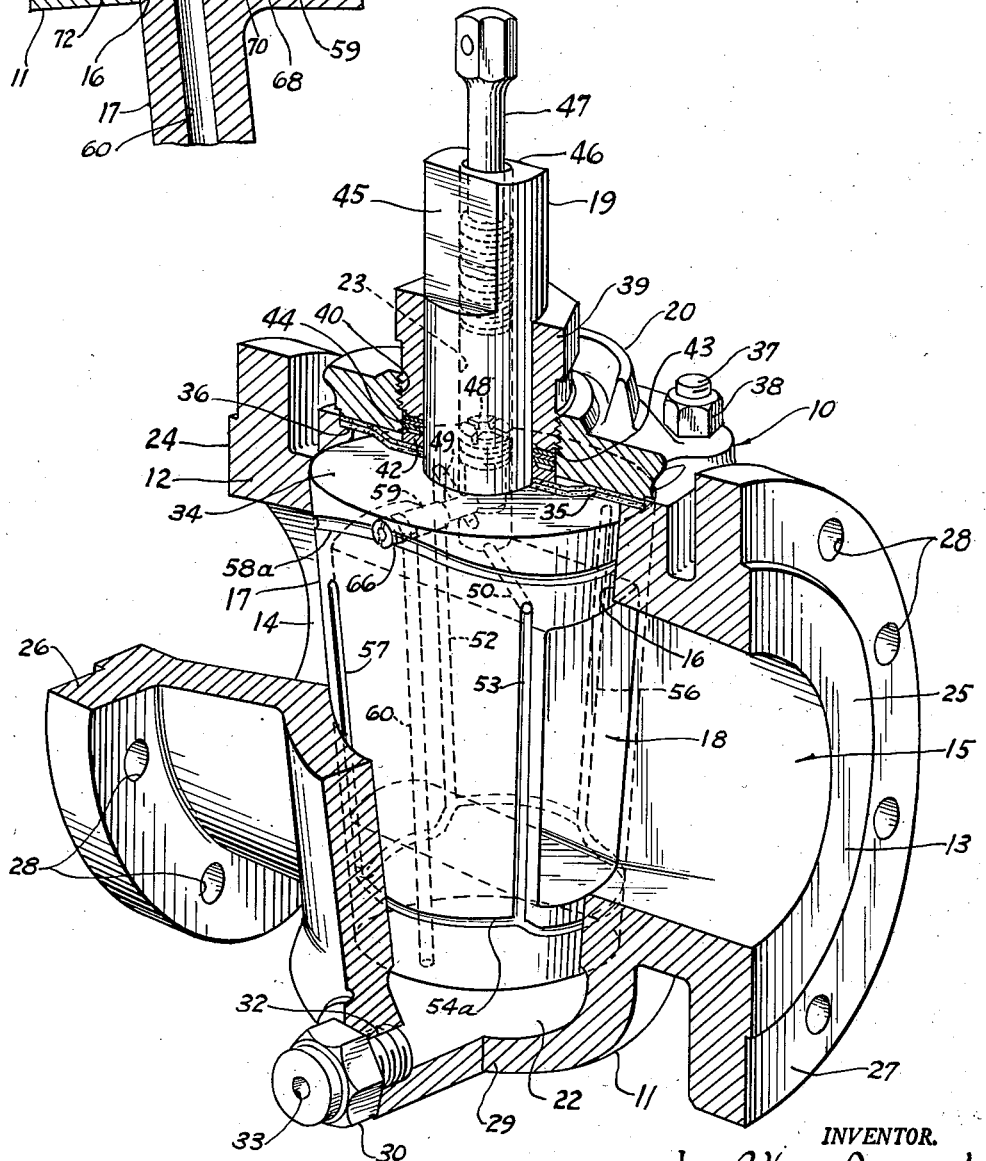
INVENTOR.
Joye C. Haun, Deceased
By Florence Patricia Mills, Executrix
By Albert G. McCaleb
Attorney Patented Feb. 19, 1952

2,586,650

UNITED STATES PATENT OFFICE 2,586,650

PLUG VALVE

Joye C. Haun, deceased, late of San Francisco, Calif., by Florence Patricia Mills, executrix, Wallowa, Oreg., assignor to Florence Patricia Mills, Wallowa, Oreg.

Application January 10, 1947, Serial No. 721,345

4 Claims. (Cl. 251—93)

This invention relates to plug valves, and more particularly to such valves of the lubricated type wherein the lubricant has additional functions, including action as a sealing compound and as a force transmitting medium for effecting relief of the parts when they tend to stick.

One of the objects of the invention is to provide a plug valve of the tapered plug type wherein a system of connected grooves frames three sides of each port and a separate groove extends along the other side of the port in either the open or closed positions of the valve, and wherein said grooves are supplied with lubricant through a system of passages and check valves in such a way that the lubricant resists leakage of the valve even when the valve plug is jacked to effect its relief for movement.

Another object of this invention is to provide a plug valve of the tapered plug type wherein a system of passages and grooves is utilized to conduct lubricant to the seating surfaces and wherein said grooves are constructed and arranged to promote long wear and consistent performance of the seating surfaces.

It is a further object of the present invention to provide a plug valve incorporating improved check valve means for controlling the feeding of lubricant to the valve parts.

Other objects and advantages of the invention will be apparent from the following description and the accompanying drawings, in which similar characters of reference indicate similar parts throughout the several views.

In the two sheets of drawings:

Fig. 1 is a perspective view of a valve embodying a preferred form of the invention and wherein the valve housing is longitudinally sectionalized along angularly disposed planes to show the details of the housing structure in section and the valve plug in elevation;

Fig. 2 is a fragmentary sectional view drawn to an enlarged scale and taken substantially on a line 2—2 of Fig. 1;

Fig. 3 is a fragmentary sectional view similar to Fig. 2 and which depicts a modification of the check valve structure; and Fig. 4 is a view similar to Fig. 1 of a valve embodying a modification of the present invention.

In its more general aspects, the valve 10 which is depicted in Fig. 1 for illustrative purposes has a housing 11 provided at opposite ends with flange-type connecting portions 12 and 13. Opposed ports 14 and 15 provide inlet and outlet openings for the valve and communicate with a frusto-conical bore 16 the axis of which frusto-conical bore is transverse to the axes of the ports 14 and 15. Seated within the frusto-conical bore 16 and adapted to be rotated therein is a frusto-conical valve plug 17 provided with a through bore 18 transverse to the axis of the valve plug and disposed at a position for providing communication between the ports 14 and 15 in the housing when the plug is turned to a position of alignment with the housing ports.

At its upper end the valve plug 17 has a cylindrical stem 19 secured thereto and projecting axially from the end surface of the plug. A cover plate 20 surrounds the stem 19 and covers the frusto-conical bore at the larger end of the plug so that assembly and removal of the plug with respect to the housing may be accomplished by placement and removal of the cover plate. Adjacent the smaller end of the valve plug 17 the housing is formed to provide a lubricant chamber 22 in which chamber lubricant pressure may be built up to effect a jacking force upon the plug to relieve it in the event of its freezing in one position.

As will be more fully explained, the valve stem 19 has therein a cylindrical bore 23 which extends into the end portion of the plug and provides a lubricant chamber. Also the plug is provided with a system of external grooves and passages communicating therewith through which grooves and passages the co-acting frusto-conical seating surfaces of the plug and housing are provided with lubricant for both sealing and lubricating purposes.

Considered more in detail, the flange-type connecting portions 12 and 13 of the valve housing have their seating surfaces 24 and 25 respectively from which flanges 26 and 27 project radially. The usual circumferentially spaced apertures 28 extend axially through the flanges 26 and 27 to accommodate fastening elements such as bolts for securing the valve to adjoining fittings.

Although the outer ends of the ports 14 and 15, as well as the seating surfaces 24 and 25 and the flanges 26 and 27, are desirably circular for convenience in making connections to the usual forms of pipes or pipe fittings, the through bore 18 in the disclosed type of valve is, by preference, substantially rectangular. Thus, the internal surfaces of the ports 14 and 15 are so conformed that they smoothly change in shape between their inner and outer ends so as substantially to align at their inner ends with the ends of the through bore 18.

In the position of the valve shown in Fig. 1, the plug 17 is disposed to provide full communication between the inlet and outlet ports of the valve housing. When rotated 90° from the position shown in Fig. 1, the seating surfaces of the plug completely close the inner ends of the ports 14 and 15 and thus stop all fluid flow through the valve. Since there is sometimes a tendency for plug valves to stick or become frozen in a position to which they have been set, particularly when used in a high pressure system, it is desirable that the frusto-conical plug may be moved outwardly of the housing in the direction of its taper in order to relieve the seating surfaces before the plug is turned. The force of lubricant under pressure within the chamber 22 at the small end of the plug 17 is utilized for effecting the desired axial movement of the plug in the disclosed valve.

At one side of a lower wall 29 of the valve housing a pressure fitting 30 is threaded into an aperture 32 which communicates with the interior of the lubricant chamber 22. This pressure fitting 30 has a lubricant passage 33 and is provided internally with a suitable type of pressure actuated check valve so that lubricant may be introduced into the chamber therethrough but leakage is prevented between the applications of external lubricant pressure.

In order to allow limited axial movement of the plug 17 within the housing and yet maintain a fluid-tight seal at the end of the frusto-conical bore therein, the cover plate 20 is axially spaced from a substantially plane end surface 34 of the plug and a seal is effected between the housing and the plug by parts including a flexible diaphragm 35. The outer edge of the diaphragm 35 is clamped between a shoulder 36 adjacent the frusto-conical bore in the housing and the outer edge of the cover plate 20. In the illustrated valve, studs such as 37 are secured to the housing and project through apertures in the cover plate 20 and are provided with nuts such as 38 for holding the cover plate in place.

A gland 39 fits over the cylindrical surface of the stem 19 and is threaded into a central bore 40 in the cover plate. A pressure ring 42 rests against the surface of the diaphragm 35 adjacent the stem 19 and is movable axially within the bore 40. An inner end surface 43 of the gland 39 is desirably curved and presses against a plurality of flexible resilient rings 44 to bias the pressure ring 42 downwardly against the surface of the diaphragm, thus holding the diaphragm tightly against the surface 34 of the plug. The surface of the pressure ring 42 adjacent the resilient rings 44 is channeled so that a sufficient force upwardly against the bottom of the plug will flex the resilient rings at the channeled surface of the pressure ring, thereby to permit a limited axial movement of the plug.

Due to the tapering of the seating surfaces of the housing and plug, an upward movement of the plug toward its larger end and against the action of the resilient rings 44 frees the plug for turning movement by a wrench or handle fitted onto flattened surfaces 45 and 46 at the end of the stem 19. The gland 39 is tightened to an adjusted position in which it exerts a desired and effective holding pressure against the surfaces of the resilient rings 44.

A plunger 47 is threaded into the outer end of the cylindrical bore 23 in the stem 19. Within the bore 23 and near its lower end is a check valve 48 which is disposed to function in a manner such that it will permit lubricant under pressure to move downwardly through the stem bore 23, but will check its return movement.

Below the check valve 48 opposed lateral bores 49 and 50 in the plug 17 provide communication between the stem lubricant chamber and longitudinally extending grooves 52 and 53 in the seating surface of the plug. The grooves 52 and 53 are spaced from, but extend along opposite sides of the through bore 18 in the plug. Preferably these grooves are somewhat longer than the side edges of the through bore and the passages 49 and 50 open into the groove at positions displaced axially of the plug and toward the larger end surface thereof from the near end surface of the through bore 18.

Near the smaller end surface of the plug and below the level of the lower end surface of the through bore 18, a circumferential groove 54 extends all of the way around the lower seating surface of the plug and is connected for communication with the lower ends of the longitudinal grooves 52 and 53. At diametrically opposed positions displaced substantially 90° around the plug from the longitudinal grooves 52 and 53, additional longitudinal grooves 56 and 57 extend along opposite side edges of the through bore 18 in spaced relationship thereto. At their lower ends the longitudinal grooves 56 and 57 open into the circumferential groove 54. Longitudinally the grooves 56 and 57 are substantially coextensive with the grooves 52 and 53, extending to positions above the upper surface of the through bore.

Through this portion of the system of passages and grooves in the plug 17 lubricant moves outwardly from the lower end of the stem lubricant chamber 23 through the passages 49 and 50 to the upper ends of the grooves 52 and 53 respectively. Through the grooves 52 and 53 the lubricant passes to the lower circumferential groove 54 to fill that groove and passes thence to the grooves 56 and 57. When the valve is in the open position, as shown in Fig. 1, the grooves 52 and 57 are disposed along opposite side edges of the through bore 18 at one end thereof, while grooves 53 and 56 are disposed along opposite side edges of the through bore at the other end thereof. During turning movement of the plug the lubricant in the grooves is spread across the seating surfaces of the tapered bore of the housing. When the valve is in the closed position, the grooves 53 and 57 are disposed on opposite sides of one of the ports and the grooves 52 and 56 are on opposite sides of the other port. In either position the groove 54 extends across the lower edges of the ports so that when the valve is fully opened or completely closed, the ports are framed on three sides by a continuous system of lubricant grooves. Such framing of the ports improves the sealing of the valve in either the open or closed position and especially if a proper type of lubricant is used for the purpose.

In addition to the aforementioned grooves in the seating surface of the plug, a circumferential groove 58 desirably extends around the plug at a position between the top of the through bore 18 and the larger plane end surface 34 of the plug. Diametrically opposed lateral bores 59 and 59a in the plug connect the groove 58 to the stem lubricant chamber 23 below the check valve 48 and thereby provide passages for the flow of lubricant from that chamber into the groove 58.

In order to improve the wearing qualities of the valve seats in the region of the circumferential grooves 54 and 58 and so as to improve the sealing and lubrication effected by the lubricant in those grooves, it is preferred to utilize circumferential grooves 55 and 65 in the housing seating surfaces which overlie the circumferential grooves 54 and 58 respectively in the plug. It is by preference also that the grooves 55 and 65 are wider than their associated grooves 54 and 58 so that portions of the plug seating surfaces are exposed within the grooves 55 and 65. By making the grooves 55 and 65 wider than the grooves 54 and 58 respectively, the plug may move longitudinally within predetermined limits without disrupting the sealing effect of the lubricant within the grooves.

In the preferred valve structures disclosed herein, the passage 59 is connected at a position near its outer end, and through a passage 60 which extends longitudinally through the plug, to the housing lubricant chamber 22. Furthermore, a check valve, which may be of either the type shown in Fig. 2 or that shown in Fig. 3, is mounted in a counterbore 66 at the outer end of the passage 59 to control the flow of lubricant therethrough. When the opposed passages such as 59 and 59a of Fig. 1 are utilized in the valve plug, a similar counterbore 66a at the outer end of that passage also carries a check valve such as one of the disclosed types similarly disposed.

In the check valve shown in Fig. 2, the counterbore 66 at the outer end of the passage 59 provides seat 67 against which a ball 68 seats to check lubricant tending to flow through the passage 59 toward the stem lubricant chamber 23. A ball retaining plug 69 is pressed into the outer end of the counterbore 66 and extends inwardly to a sufficient extent to prevent the ball 68 from falling down so as to close the end of the opening 60. The plug, however, allows movement of the ball 68 away from the seat 67 to permit the flow of lubricant outwardly from the lubricant chamber 23 toward the associated circumferential grooves 58 and 65 as well as downwardly through the passage 60. Any lubricant pressure in the reverse direction, as might be effected by an increase of the pressure in the lubricant chamber 22, moves the ball 68 against the seat 67 and thereby prevents the feeding of lubricant from the chamber 22 into the chamber 23. The lubricant in the chamber 22 being more likely to become contaminated by line material than that in the stem chamber 23, the use of the check valve provides insurance of supply of clean lubricant in the chamber 23.

Rather than being pressure-operated like the check valve shown in Fig. 2, the valve of Fig. 3 is a normally closed spring-urged type. In this valve the ball 68 is normally biased toward seating engagement with the seat 67 by a compression spring 70, said spring being disposed between the ball 68 and a retaining ring 72 threaded into the outer end of the counterbore. As in the operation of the valve of Fig. 2, the spring-urged check valve of Fig. 3 prevents the flow of lubricant into the stem chamber 23 through the passage 59 but permits the flow of lubricant outwardly from the chamber 23 when the lubricant pressure exerted is sufficient to overcome the biasing force of the valve spring 70.

With either type of check valve thus disposed, the lubricant chambers 23 and 22 are interconnected in such a way that pressure applied to the lubricant within the chamber 23 not only forces lubricant outwardly therefrom and into the connected passages and grooves, but also increases the pressure upon the lubricant in the chamber 22 so that jacking force may be applied to the valve plug by operation of the plunger 47 at the stem end of the valve. The check valve also prevents the forcing of lubricant into the grooves 52, 53, 54, 56 and 57 when jacking force is applied to the valve plug through the introduction of lubricant under pressure into the housing chamber 22.

In the modified form of the invention which is illustrated in Fig. 4, the general structure of the valve is similar to that shown and described in connection with Fig. 1, and like reference characters refer to similar parts in both figures. The distinctive features of the valve of Fig. 4 will be separately described.

As depicted in Fig. 4, the upper and lower circumferential grooves 58a and 54a respectively both follow sinuous paths in their extent around the plug seating surfaces. Such sinuous grooves effectively distribute the lubricant over a wider area of the plug seating surfaces than the width of the grooves themselves and tend to distribute wear so as to avoid the wearing of ridges upon the housing seating surfaces. It may be noted that with this arrangement of the plug grooves, the associated grooves 55 and 65 of Fig. 1 in the seating surfaces of the housing have been omitted.

It may also be noted by a comparison of Figs. 1 and 4 that the lubricant chambers 23 and 22 are connected through only one lateral passage 59 and one longitudinal passage 60. The check valve utilized in the passage 59 may be of the types shown in either Figs. 2 or 3.

While a preferred embodiment of this invention has been illustrated, many modifications may be made without departing from the spirit of the invention, and it is not intended that the invention is to be limited to the precise details of the construction set forth, but shall include all of the changes within the scope of the appended claims.

Having thus described the present invention, what is claimed as new and desired to be secured by Letters Patent of the United States is:

1. A lubricated valve comprising, in combination, a housing provided with a frusto-conical bore presenting a seating surface and having inlet and outlet ports communicating with the bore, a frusto-conical plug having a seating surface fitted for rotational movement in said bore and having a passage therethrough for connecting the inlet and outlet ports when the plug is in a predetermined position relative to the housing and closing said ports when rotated to another position, said plug having a stem projecting from one end thereof, said stem having a lubricant chamber therein for holding a supply of lubricant, means for applying pressure to the lubricant in said chamber, closure means secured to said housing and surrounding said stem, one of said seating surfaces having a system of lubricant grooves therein from which lubricant is spread over the seating surfaces when the plug is rotated in the housing, said system of lubricant grooves including circumferential grooves encircling the plug near opposite ends thereof and in spaced relationship to said plug passage and longitudinally extending grooves on opposite sides of both ends of the plug passage and adjoining one of the circumferential grooves, said housing having a second lubricant chamber therein at the end of the plug opposite the stem, means providing an inlet for lubricant under pressure to the last-mentioned chamber so as to apply lifting force against the end of the plug, said plug having lateral passages therein connecting the stem chamber to opposed ones of said longitudinal grooves at the ends thereof opposite said one of the circumferential grooves, an additional lateral passage connecting the stem lubricant chamber to the other of the circumferential grooves, said means providing an inlet for lubricant under pressure including a longitudinal passage in the plug connecting the housing lubricant chamber to said additional lateral passage, and a check valve including a retaining ring mounted in the outer end of said additional lateral passage and a ball movable longitudinally in the said passage for restricting the flow of lubricant through the inner portion of the additional lateral passage to an outward direction from the stem lubricant chamber.

2. A lubricated valve comprising, in combination, a housing provided with a frusto-conical bore presenting a seating surface and having inlet and outlet ports communicating with the bore, a frusto-conical plug having a seating surface fitted for rotational movement in said bore and having a passage therethrough for connecting the inlet and outlet ports when the plug is in a predetermined position relative to the housing and closing said ports when rotated to another position, said plug having a stem projecting from one end thereof, said stem and the adjacent end portion of the plug having a lubricant chamber therein for holding a supply of lubricant, means for applying pressure to the lubricant in said chamber, closure means secured to said housing and surrounding said stem, said seating surfaces having a system of lubricant grooves therein from which lubricant is spread over the seating surfaces when the plug is rotated in the housing, said system of lubricant grooves including upper and lower circumferential grooves in said plug spaced from opposite edges of said plug passage and circumferential grooves in the seating surfaces of the housing overlying and of somewhat greater width than said circumferential grooves in the plug, said housing having a second lubricant chamber therein at the end of the plug opposite the stem, means providing an inlet for lubricant under pressure to the last mentioned chamber so as to apply lifting force against the end of the plug, said plug having lateral passages therein connecting the stem chamber to said systems of grooves, said means providing an inlet for lubricant under pressure including a longitudinal passage in the plug connecting the housing lubricant chamber to one of said lateral passages, and a check valve mounted in said one lateral passage for restricting the flow of lubricant to one direction through the inner portion of the one lateral passage between the stem lubricant chamber and said longitudinal passage.

3. A lubricated valve comprising, in combination, a housing provided with a frusto-conical bore presenting a seating surface and having inlet and outlet ports communicating with the bore, a frusto-conical plug having a seating surface fitted for rotational movement in said bore and having a passage therethrough for connecting the inlet and outlet ports when the plug is in a predetermined position relative to the housing and closing said ports when rotated to another position, said plug having a stem projecting from one end thereof, said stem having a lubricant chamber therein for holding a supply of lubricant, means for applying pressure to the lubricant in said chamber, closure means secured to said housing and surrounding said stem, one of said seating surfaces having a system of lubricant grooves therein from which lubricant is spread over the seating surfaces when the plug is rotated in the housing, said system of lubricant grooves including circumferential grooves encircling the plug near opposite ends thereof and in spaced relationship to said plug passage and longitudinally extending grooves on opposite sides of both ends of the plug passage and adjoining only one of the circumferential grooves so as to circumscribe opposite sides of the ports when the valve is fully open or closed, said housing having a second lubricant chamber therein at the end of the plug opposite the stem, means providing an inlet for lubricant under pressure to the last mentioned chamber so as to apply lifting force against the end of the plug, said plug having passages therein connecting the stem chamber to said system of grooves, said means providing an inlet for lubricant under pressure including a passage in the plug communicating with only one of the aforementioned passages for providing communication between said lubricant chambers, and a check valve in said one of the aforementioned passages for preventing the flow of lubricant from the housing lubricant chamber to the stem lubricant chamber.

4. A lubricated valve comprising, in combination, a housing provided with a frusto-conical bore presenting a seating surface and having inlet and outlet ports communicating with the bore, a frusto-conical plug having a seating surface fitted for rotational movement in said bore and having a passage therethrough for connecting the inlet and outlet ports when the plug is in a predetermined position relative to the housing and closing said ports when rotated to another position, said plug having a stem projecting from one end thereof, said stem having a lubricant chamber therein for holding a supply of lubricant, means for applying pressure to the lubricant in said chamber, closure means secured to said housing and surrounding said stem, one of said seating surfaces having a system of lubricant grooves therein from which lubricant is spread over the seating surfaces when the plug is rotated in the housing, said system of lubricant grooves including circumferential grooves encircling the plug in sinuous paths near opposite ends thereof and in spaced relationship to said through bore, said housing having a second lubricant chamber therein at the end of the plug opposite the stem, means providing an inlet for lubricant under pressure to the last-mentioned chamber so as to apply lifting force against the end of the plug, said plug having passages therein connecting the stem chamber to said system of grooves and including separate passages through which communication is provided from the stem lubricant chamber to said circumferential grooves, a passage in the plug providing communication between said lubricant chambers, and a check valve in one of said passages for preventing the flow of lubricant from the housing lubricant chamber to the stem lubricant chamber.

FLORENCE PATRICIA MILLS.

*Executrix of the Last Will and Testament of Joye C. Haun, Deceased.*

REFERENCES CITED

The following references are of record in the file of this patent:

UNITED STATES PATENTS

| Number | Name | Date |
|---|---|---|
| 1,572,030 | Nordstrom | Feb. 9, 1926 |
| 1,961,102 | Fennema | May 29, 1934 |
| 2,026,891 | Haun | Jan. 7, 1936 |
| 2,048,384 | Jacobsen | July 21, 1936 |
| 2,058,747 | Wilkens | Oct. 27, 1936 |
| 2,069,013 | Nordstrom | Jan. 26, 1937 |
| 2,313,090 | Reiser | Mar. 9, 1943 |
| 2,360,599 | Volpin | Oct. 17, 1944 |